S. W. WILT.
NUT LOCK.
APPLICATION FILED OCT. 25, 1909.
972,669.
Patented Oct. 11, 1910.
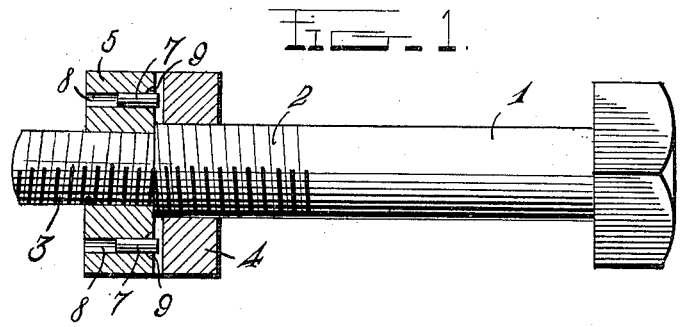
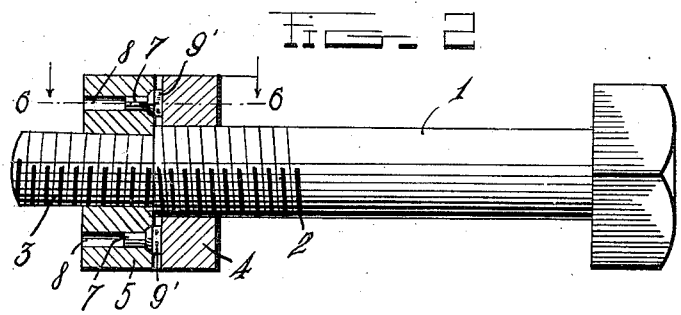
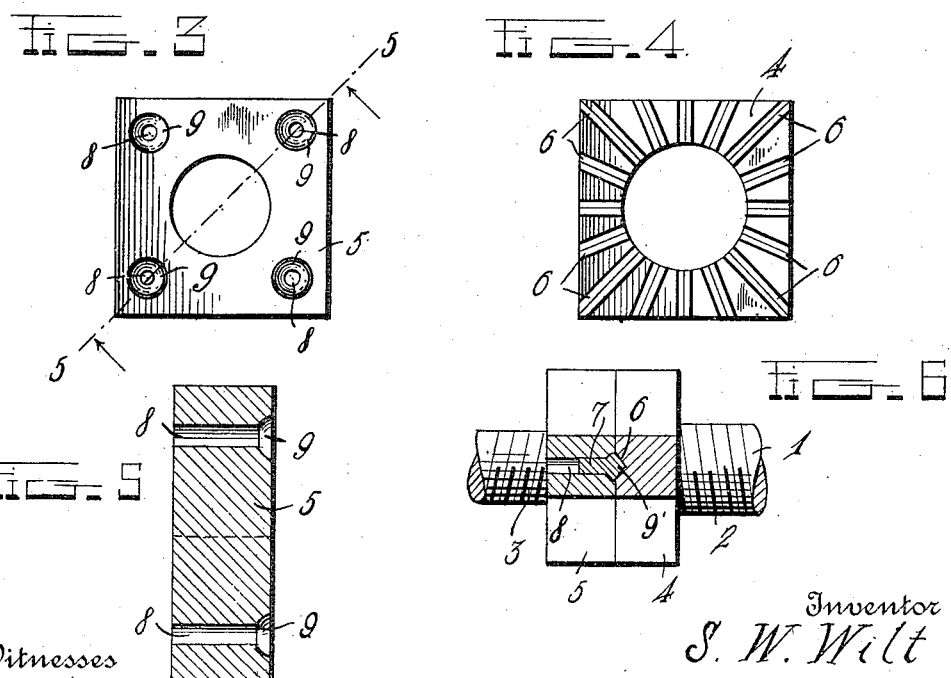
Witnesses
C. R. Hardy
C. H. Griesbauer
Inventor
S. W. Wilt
by H. B. Willson & Co.
Attorneys
THE NORRIS PETERS CO., WASHINGTON, D. C.

UNITED STATES PATENT OFFICE.

SAMUEL W. WILT, OF FREMONT, OHIO.

NUT-LOCK.

972,669.   Specification of Letters Patent.   Patented Oct. 11, 1910.

Application filed October 25, 1909. Serial No. 524,414.

*To all whom it may concern:*

Be it known that I, SAMUEL W. WILT, a citizen of the United States, residing at Fremont, in the county of Sandusky and State of Ohio, have invented certain new and useful Improvements in Nut-Locks; and I do declare the following to be a full, clear, and exact description of the invention, such as will enable others skilled in the art to which it appertains to make and use the same.

This invention relates to improvements in nut locks and aims to improve upon nut locks of that type in which locking pins are employed to secure the nut against working loose upon the bolt or other threaded part.

With the foregoing and other objects in view, the invention consists of certain novel features of construction, combination and arrangement of parts, as will be more fully described and particularly pointed out in the appended claim.

In the accompanying drawings, Figure 1 is a central longitudinal section of a nut lock embodying my improvements, showing the position of the locking pins before driven into engagement with the locking grooves of the main nut. Fig. 2 is a similar view subsequent to driving the locking pins into engagement with the grooves of the main nut. Fig. 3 is a detail inside elevation of the jam nut. Fig. 4 is a detail view of the main nut. Fig. 5 is a diagonal section taken on the line 5—5 of Fig. 3, and Fig. 6 is a horizontal section taken on the plane indicated by the dotted line 6—6 of Fig. 2.

Referring to the drawings which are for illustrating purposes only and are therefore not drawn to scale, 1 designates the bolt shown in the present instance as provided with right and left hand screw threads 2 and 3, respectively.

4 indicates the main nut which is screwed on the right hand thread of the bolt, and 5 the jam nut which is screwed on the left hand thread of the bolt against the main nut. The outer face of the main nut is provided with a series of radial V-shaped locking grooves 6 (see more particularly Figs. 4 and 6 of the drawings) which extend entirely therearound and with which are adapted to engage the inner ends of locking pins 7, which are inserted through the jam nut near opposite corners thereof before it is screwed in position. The inner face of the jam or locking nut is provided with annular recesses or countersinks 9 which are adapted to receive the heads 9' of the pins when in jam position. The bodies of the locking pins are of a length approximately equal to one-half the one-half width of the jam nut so that when driven into engagement with the teeth of the main nut the heads of said pins seat in the recess or countersinks of the jam nut.

In practice, the pins are inserted in position in the jam nut, the jam nut then screwed up against the main nut and the inner ends of the locking pins forced into engagement with the ratchet teeth by a riveting hammer or other suitable tool applied to the outer ends of the pins.

From the foregoing, it will be seen that when the pins are in locking position the main nut cannot turn on account of the jam nut and that any tendency of the main nut to turn only tightens the locking nut the more.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claim.

Having thus described my invention, what I claim is:

The combination with a bolt provided with right and left hand threads, of a main nut adapted to engage the innermost of said threads and provided in its outer face with a plurality of radially disposed V-shaped locking grooves, a locking nut adapted to engage the outermost of said threads and provided with a plurality of transverse apertures arranged adjacent each corner of the nut, annular recesses in the inner face of the locking nut surrounding each of said apertures, a plurality of locking pins extending into said apertures and having their inner ends shaped to fit into the radial grooves of the main nut, the heads of said pins when in operative position, being adapted to lie wholly within the annular recesses in the locking nut.

In testimony whereof I have hereunto set my hand in presence of two subscribing witnesses.

SAMUEL W. WILT.

Witnesses:
KATHARYN FOLEY,
JOHN J. LEHMAN.